United States Patent [19]

Takao et al.

[11] Patent Number: 4,889,881

[45] Date of Patent: Dec. 26, 1989

[54] ETHYLENE-α-OLEFIN VULCANIZED RUBBER COMPOSITION

[75] Inventors: Hiroyoshi Takao, Chiba; Yoshio Tanimoto, Sakura; Kiyosi Ikeda, Ichihara, all of Japan

[73] Assignee: Sumitomo Chemical Company, Limited, Osaka, Japan

[21] Appl. No.: 230,661

[22] Filed: Aug. 9, 1988

Related U.S. Application Data

[63] Continuation of Ser. No. 34,943, Apr. 6, 1987, abandoned.

[30] Foreign Application Priority Data

Apr. 14, 1986 [JP] Japan .................................. 61-85802

[51] Int. Cl.$^4$ ........................... C08K 3/36; C08K 5/14; C08L 23/16
[52] U.S. Cl. ........................................ 524/91; 524/96; 524/97; 524/102; 524/493; 524/534; 524/579
[58] Field of Search ..................... 524/91, 96, 97, 102, 524/493, 534, 579

[56] References Cited

U.S. PATENT DOCUMENTS

| | | | |
|---|---|---|---|
| 3,893,968 | 7/1975 | Shiga et al. | 524/287 |
| 4,066,590 | 1/1978 | Eldred et al. | 524/292 |
| 4,145,475 | 3/1979 | Vostovich | 428/379 |
| 4,346,196 | 8/1982 | Hoh | 428/500 |
| 4,467,061 | 8/1984 | Yamamoto et al. | 524/528 |
| 4,511,619 | 4/1985 | Kuhnel | 428/215 |
| 4,603,158 | 7/1986 | Markham | 523/106 |
| 4,707,514 | 11/1987 | Katsuki et al. | 524/474 |

FOREIGN PATENT DOCUMENTS 0043445 2/1987 Japan .
02088 4/1986 PCT Int'l Appl. .

*Primary Examiner*—Herbert J. Lilling
*Attorney, Agent, or Firm*—Stevens, Davis, Miller & Mosher

[57] ABSTRACT

An ethylene-α-olefin vulcanized rubber composition with excellent weather resistance and high transparency which is formed by vulcanizing with an organic peroxide an unvulcanized rubber composition comprising an ethylene-α-olefin rubber containing no metal oxide nor metal carbonate.

12 Claims, No Drawings

ETHYLENE-α-OLEFIN VULCANIZED RUBBER COMPOSITION

This application is a continuation of application Ser. No. 034,943, filed Apr. 6, 1987, abandoned.

BACKGROUND OF THE INVENTION

1. Field of the Invention

This invention relates to an ethylene-α-olefin vulcanized rubber composition having a high strength and further an excellent thermal resistance, excellent weather resistance, and high transparency.

Uses of rubber compositions which require a high strength, thermal resistance and weather resistance and further a high transparency include automotive parts, industrial goods, electrical parts, etc. Rubber compositions having such properties can be used, for example, as materials for tubes, hoses, sheets, rolls, and the see-through part of masks and the like. Further, they can be used to form composite materials by combining them with glass or transparent resins such as polymethyl methacrylate and polycarbonate.

2. Description of the Prior Art

It is known that rubber composition with some transparency, called "semi-translucent rubber", can be obtained by adding to ethylene-α-olefin rubber silica and/or magnesium carbonate as a reinforcing filler. However, they have defects of a low total light transmittance and a high haze value.

The present inventors have already obtained vulcanized rubber compositions which give a high total light transmittance and a low haze value by vulcanizing with an organic peroxide an unvulcanized rubber composition characterized by being formed by adding to an ethylene-α-olefin rubber 10 to 70 parts by weight of anhydrous silica with an average particle diameter of its primary particles of 20 nm or less relative to 100 parts by weight of said rubber without addition of metal oxides or metal carbonates thereto (see Japanese Patent Application No. 183,753/85).

However, these rubber compositions are still of low strength and unsatisfactory in thermal resistance, weather resistance, etc. because they contain no metal oxide nor metal carbonate added thereto. Accordingly, improvement thereof has been eagerly awaited.

SUMMARY OF THE INVENTION

The object of this invention is to provide, obviating the disadvantages of prior arts mentioned above, an ethylene-α-olefin vulcanized rubber composition which has a high strength, excellent thermal resistance and weather resistance, and further a high total light transmittance and a low haze value.

The present inventors have made extensive studies to develop such a vulcanized rubber composition and resultantly attained this invention.

Thus, this invention relates to an ethylene-α-olefin vulcanized rubber composition with excellent weather resistance and high transparency which is obtained by vulcanizing with an organic peroxide an unvulcanized rubber composition comprising an ethylene-α-olefin rubber containing no metal oxide nor metal carbonate added thereto and containing (1) 10 to 70 parts by weight of anhydrous silica with an average particle diameter of its primary particles of 20 nm or less, 0.01 to 2 parts by weight of at least one compound selected from those represented by the general formulas (I), (II) and (III) shown below, and 0 to 2 parts by weight of at least one compound selected from those represented by the general formulas (V) and (VI) shown below, each relative to 100 parts by weight of said rubber, or (2) 10 to 70 parts by weight of anhydrous silica with an average particle diameter of its primary particles of 20 nm or less, 0.01 to 2 parts by weight of at least one compound selected from those represented by the general formulas (I), (II) and (III) shown below, 0.01 to 2 parts by weight of a compound represented by the general formula (IV) shown below, and 0 to 2 parts by weight of at least one compound selected from those represented by the general formulas (V) and (VI) shown below, each relative to 100 parts by weight of said rubber:

General formula (I)

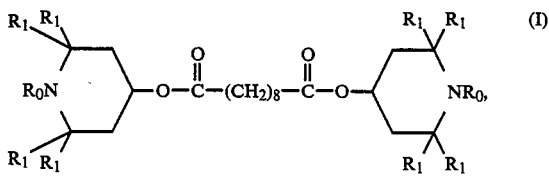

wherein $R_0$ denotes hydrogen or an alkyl group of 1 to 3 carbon atoms, and $R_1$ denotes an alkyl group of 1 to 3 carbon atoms;

General formula (II)

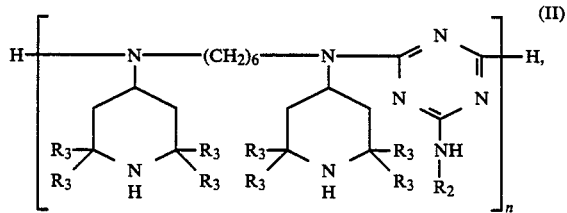

wherein $R_2$ denotes an alkyl group of 6 to 10 carbon atoms, $R_3$ denotes an alkyl group of 1 to 3 carbon atoms, and n denotes a real number from 1 to 5;

General formula (III)

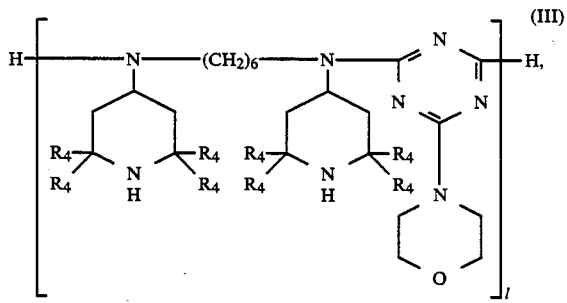

wherein $R_4$ denotes an alkyl group of 1 to 3 carbon atoms, and l denotes a real number from 1 to 5;

General formula (IV)

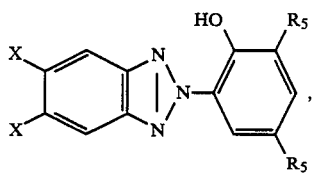

wherein $R_5$ denotes hydrogen or an alkyl group of 1 to 8 carbon atoms, and X denotes hydrogen or chlorine;

General formula (V)

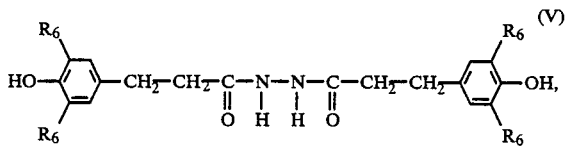

wherein $R_6$ denotes an alkyl group of 1 to 9 carbon atoms;

General formula (VI)

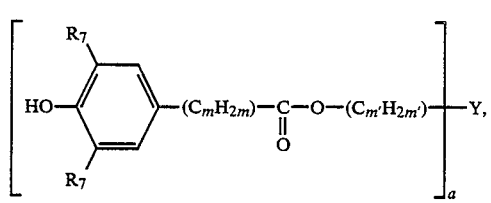

wherein $R_7$ denotes an alkyl group of 1 to 6 carbon atoms, Y denotes C, S, C—C or O—C—C—O, a denotes a number of 1, 2 or 4, m denotes an integer from 1 to 6 and m' denotes an integer from 1 to 16.

DETAILED DESCRIPTION OF THE INVENTION

The reason why the silica used for a reinforcing filler is restricted to anhydrous silica in this invention is that hydrous silica gives an insufficient transparency in view of total light transmittance and haze value, and such fillers as magnesium carbonate, clay, talc, and titanium white give a very poor transparency.

The reason why the average particle diameter of the primary particles of anhydrous silica is restricted to 20 nm or less in this invention is that a sufficient transparency cannot be obtained at larger particle diameter than specified above.

Further, the reason why the amount of anhydrous silica added is restricted to 10 to 70 parts by weight relative to 100 parts by weight of ethylene-α-olefin rubber is that outside the above-mentioned range the resulting rubber composition is poor in processability and physical properties and hence of no practical use and that above the said range the transparency also becomes poor.

The amount of anhydrous silica to be added is preferably 20 to 60 parts by weight.

Ethylene-α-olefin rubber compositions usually contain metal oxides such as zinc oxide and/or metal carbonates such as zinc carbonate added thereto for the purpose of increasing the cure rate and improving the thermal and weather resistance. However, they are not added in this invention because the addition of these metal oxides and/or metal carbonates causes marked decrease of total light transmittance, increase of haze value, and resultantly severe deterioration of transparency.

In this invention, stabilizers represented by the above-mentioned general formulas (I) to (VI) are used together with above-mentioned anhydrous silica. Among these stabilizers of various kinds, at least one compound selected from those represented by the general formulas (I), (II) and (III), or said at least one compound and a compound represented by the general formula (IV), are indispensable components. The amount thereof to be added is, for both cases, 0.01 to 2 parts by weight, preferably 0.05 to 1 part by weight, most preferably 0.1 to 0.5 part by weight, relative to 100 parts by weight of ethylene-α-olefin rubber. When the compound amount is less than the above-mentioned range, a satisfactory thermal resistance and weather resistance cannot be obtained. Use of an amount exceeding the range is unnecessary and uneconomical.

In the compound represented by the general formula (II) or (III), its molecular terminal may be in the form of other protective groups which can replace a hydrogen atom. Also, it may be the salt of said amine. These are treated as equivalent with regard to their effect.

The compounds represented by the general formulas (V) and (VI) are not indispensable components and are not necessarily needed. However, the addition of at least one compound selected from these is effective from the viewpoint of further enhancing the effect of stabilizers. They are used, in general, in an amount of 2 parts by weight or less, preferably in the range from 0.05 to 1 part by weight, most preferably 0.1 to 0.5 part by weight, relative to 100 parts by weight of ethylene-α-olefin rubber.

As the example of the compounds represented by the general formula (I) to (VI) used in this invention, there may be mentioned the followings.

General formula (I):
Bis(2,2,6,6-tetramethyl-4-piperidyl)sebacate
Bis(1,2,2,6,6-pentamethyl-4-piperidyl)sebacate General formula (II):
Poly{[6-(1,1,3,3-tetramethyl butyl)amino-1,3,5-triazine-2,4-diyl][2,2,6,6-tetramethyl-4-pyperidyl)imino]-hexamethylene[(2,2,6,6-tetramethyl-4-pyperidyl)imino]}

General formula (III):
Poly{(6-morpholino-S-triazine-2,4-diyl) [2,2,6,6-tetramethyl-4-pyperidyl)imino]-hexamethylene[(2,2,6,6-tetramethyl]-4-pyperidyl)imino]}

General formula (IV):
2-(2'-hydroxy-5'-methylphenyl)benzotriazole, 2-(2'-hydroxy-5'-t-butylphenyl)benzotriazole, 2-(2'-hydroxy-5'-amylphenyl)benzotriazole, 2-(2'-hydroxy-4'-octoxyphenyl)benzotriazole, 2-(2'-hydroxy-3',5'-di-t-butylphenyl)benzotriazole, 2-(2'-hydroxy-3'-5'-di-t-amylphenyl)benzotriazol, 2-(2'-hydroxy-3'-5'-di-methylphenyl)benzotriazole, 2-(2'-hydroxy-3'-t-butyl-5'-methylphenyl)-5-chlorobenzotriazole, 2-(2'-hydroxy-3'-5'-di-t-butylphenyl)-5-chlorobenzotriazole, 2-(2'-hydroxy-3',5'-dimethylphenyl)-5-chlorobenzotriazole.

General formula (V):
N,N'-Bis[3-(3,5-di-t-butyl-4-hydroxyphenyl)propionyl]-hydrazine.

General formula (VI):
Pentaerythritol-tetrakis[3-(3,5-di-t-butyl-4-hydroxyphenyl)]propionate, triethyleneglycol-bis[3-(3'-t-butyl-5'-methyl-4'-hydroxyphenyl))propionate, 1,6-hexanediol-bis[3-(3',5'-di-t-butyl-4'-hydroxyphenyl))]- propionate, 2,2-thio-diethylene-bis[3-(3′,5′-di-t-butyl-4-hydroxyphenyl)]propionate, 2,2-thio-diethylene-bis[3-(3′,5′-di-t-butyl-4′-hydroxyphenyl)]propionate, octadecyl-3-(3′,5′-di-t-butyl-4′-hydroxyphenyl)propionate.

These compounds, represented by the general formulas (I) to (VI), are all already known as a stabilizer for polyolefin type plastics (see, for example, Japanese Patent Application Kokoku (Post-Exam. Publn.) No. 27,624/72, Japanese Patent Application Kokai (Laid-Open) Nos. 62,835/81 and 5,349/76, etc.), but are utterly unknown as a stabilizer for vulcanized rubber compositions.

In consideration of the fact that vulcanized rubber composition differ from ordinary polyolefin type resisns not only in polymer species but also markedly in composition and process steps in respect of the former's having been incorporated with many kinds of additives including reinforcing agents, vulcanizing agents, and vulcanization accelerators and further having been subjected to a vulcanization step, it is quite surprising that, as disclosed by this invention, these compounds do exhibit an excellent effect on a specific rubber composition, namely ethylene-α-olefin rubber containing anhydrous silica.

The above-mentioned unvulcanized rubber composition of ethylene-α-olefin rubber incorporated with anhydrous silica and stabilizers is then subjected to vulcanization. In this invention, since vulcanization with sulfur or the like compounds does not give a vulcanized rubber composition of high transparency, vulcanization is conducted with an organic peroxide.

The organic peroxide to be used for the above purpose is not specifically limited, and may be one or more kinds of organic peroxides including diacyl peroxides, dialkyl peroxides, peroxyesters, and perketals. As specific examples thereof, mention may be made of benzoyl peroxide, 1,1-di-t-butylperoxy-3,3,5-trimethylcyclohexane, di-t-butylperoxydiisopropylbenzene, dicumylperoxide and 2,5-dimethyl-2,5-di(t-butylperoxy)hexane. These peroxides are added in an amount of 1 to 5 parts by weight relative to 100 parts by weight of the rubber component.

As occasion demands, ethylene dimethacrylate, trimethylpropane trimethacrylate, triallyl isocyanurate, and like compounds may be added as a co-crosslinking agent for organic peroxide vulcanization.

The method of vulcanization itself to be used for the above-mentioned organic peroxide vulcanization in this invention is not specifically limited and may be any conventional method known to the art. However, vulcanization is usually conducted at 140° to 200° C. for 2 to 60 minutes.

The "ethylene-α-olefin rubber" referred to in this invention means a copolymer of ethylene and one or more kinds of α-olefins and a copolymer of ethylene, one or more kinds of α-olefins, and one or more kinds of unconjugated dienes. Examples of α-olefins include propylene, 1-butene, 1-pentene, and 1-hexene. Examples of unconjugated dienes include dicyclopentadiene, ethylidenenorbornene, 1,4-hexadiene, methyltetrahydroindene, and methylnorbornene.

In this invention, softeners, plasticizers, processing aids, stearic acid, etc. known to the rubber industry may be added to the composition as occasion demands.

This invention will be described in detail below with reference to Examples. However, it is not limited to these Examples.

EXAMPLES 1 TO 5 AND COMPARATIVE EXAMPLES 1 TO 4

Mixtures compounded according to Table 1 were kneaded by use of a 6-inch roll and then vulcanized in a press under the vulcanization conditions shown in Table 1 to obtain sheets of 1 mm thickness and of 2 mm thickness.

The total light transmittance and the haze value of the 1 mm thick sheets obtained above were determined according to ASTM D1003-61.

The 2 mm thick sheets were used to prepare No. 3 dumbbell test pieces specified in JIS K6301, which were then used for a tensile test, hardness test, thermal aging resistance test, and weather resistance test.

The thermal aging resistance was tested by aging the test piece in a Geer oven at 120° C. for 120 hours, then letting it stand at room temperature for one day, and subjecting it to a tensile test.

The weather resistance was tested by exposing the test piece to a fade meter using carbon arc light (Standard UV Longlife Fade Meter, mfd. by Suga Shikenki Co., Ltd.) for 360 hours and then observing its appearance.

The results of these tests are shown in Table 2.

EXAMPLES 6 TO 10 AND COMPARATIVE EXAMPLES 5 TO 7

Mixtures compounded according to Table 3 were kneaded by use of a 6-inch roll and then vulcanized in a press under the vulcanization conditions shown in Table 3 to obtain sheets of 1 mm thickness and of 2 mm thickness.

Various kinds of tests were conducted in the same manner as in Examples 1 to 5 and Comparative Examples 1 to 4. The results thus obtained are shown in Table 4.

Notes 1 to 15 for Tables 1 and 3 and Note 16 for Table 3 are given below.

Note 1: Ethylene-propylene-ethylidenenorbornene terpolymer, mfd. by Sumitomo Chemical Co., Ltd.

Note 2: Ethylene-propylene rubber, mfd. by Sumitomo Chemical Co., Ltd.

Note 3: Hydrous silica, mfd. by Nippon Silica Kogyo K.K.; average particle diameter of primary particles: 16 nm Note 4: Anhydrous silica, mfd. by Nippon Aerosil Co.; average particle diameter of primary particles: 12 nm Note 5: Anhydrous silica, mfd. by Nippon Aerosil Co.; average particle diameter of primary particles: 7 nm Note 6: Paraffinnic process oil, mfd. by Idemitsu Kosan Co., Ltd.

Note 7: 1,1-Di-tert-butylperoxy-3,3,5-trimethylcyclohexane, mfd. by Nippon Oil & Fats Co., Ltd.

Note 8: 2,5-Dimethyl-2,5-di(t-butylperoxy)hexane, mfd. by Nippon Oil & Fats Co., Ltd.

Note 9: Bis(2,2,6,6-tetramethyl-4-piperidyl)sebacate, mfd. by Ciba-Geigy (Japan) Limited Note 10: n,n-Bis[3-(3,5-di-t-butyl-4-hydroxyphenyl)-propionyl]hydrazine, mfd. by Ciba-Geigy (Japan) Limited Note 11: Pentaerythritoltetrakis[3, (3,5-di-t-butyl-4-hydroxyphenyl)Propionate], mfd. by Ciba-Geigy (Japan) Limited Note 12: 2-(2'-hydroxy-3'-t-butyl-5'-methylphenyl)-5-chlorobenzotriazole, mfd. by Sumitomo Chemical Co., Ltd.

Note 13: Composed represented by the following structural formula

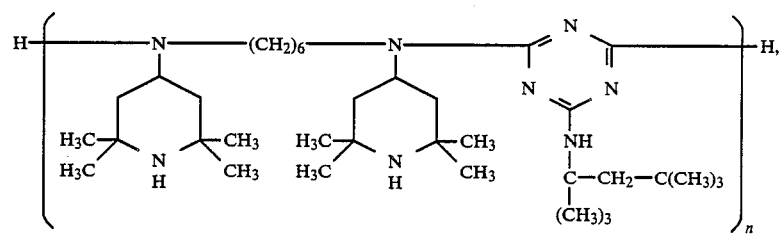

mfd. by Sumitomo Chemical Co., Ltd.

Note 14: Compound represented by the following structural formula

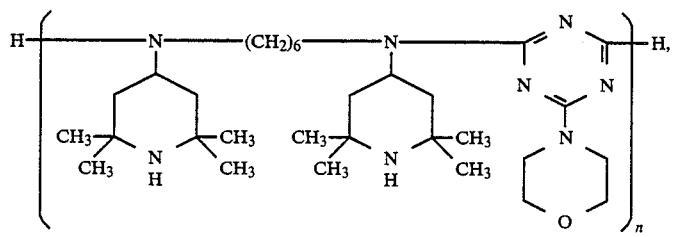

mfd. by Ciba-Geigy (Japan) Limited

Note 15: 2-(2'-hydroxy-3'-5'-t-amylphenyl)benzotriazole, mfd. by Sumitomo Chemical Co., Ltd.

TABLE 1

| Compounding ingredient and vulcanization conditions | Example | | | | | Comparative Example | | | |
|---|---|---|---|---|---|---|---|---|---|
| | 1 | 2 | 3 | 4 | 5 | 1 | 2 | 3 | 4 |
| Esprene ® 524 (Note 1) | 100 | 100 | 100 | — | — | 100 | 100 | 100 | — |
| Esprene ® 201 (Note 2) | — | — | — | 100 | 100 | — | — | — | 100 |
| Nipsil ® VN3 (Note 3) | — | — | — | — | — | — | — | 40 | — |
| Aerosil ® 200 (Note 4) | 40 | 40 | 50 | — | — | 40 | 40 | — | 20 |
| Aerosil ® 300 (Note 5) | — | — | — | 20 | 60 | — | — | — | — |
| Diana ® PW-90 (Note 6) | 10 | 10 | 10 | — | 15 | 10 | 10 | 10 | — |
| Stearic acid | 1 | 1 | 1 | 1 | 1 | 1 | 1 | 1 | 1 |
| Zinc carbonate | — | — | — | — | — | — | 5 | — | — |
| Perhexa ® 3M (Note 7) | 3 | 3 | 3 | — | — | 3 | 3 | 3 | — |
| Perhexa ® 25B (Note 8) | — | — | — | 3 | 3 | — | — | — | 3 |
| Ethylene dimethacrylate | 4 | 4 | 4 | 4 | 4 | 4 | 4 | 4 | 4 |
| Sanol ® 770 (Note 9) | 0.2 | — | 0.2 | — | 0.2 | — | — | — | — |
| Irganox ® MD1024 (Note 10) | — | 0.2 | 0.2 | 0.5 | 0.5 | — | — | — | — |
| Irganox ® 1010 (Note 11) | — | 0.2 | — | 0.5 | — | — | — | — | — |
| Sumisorb ® 300 (Note 12) | — | — | — | — | — | — | 0.5 | — | — |
| Sumisorb ® 500 (Note 13) | — | — | — | 0.2 | — | — | — | — | — |
| Sanol ® 944 (Note 14) | — | 0.2 | — | — | 0.2 | — | — | — | — |
| Vulcanization conditions | 150° C. × 10 min | | | 170° C. × 10 min | | 150° C. × 10 min | | | 170° C. × 10 min |

TABLE 2

| Properties | Example | | | | | Comparative Example | | | |
|---|---|---|---|---|---|---|---|---|---|
| | 1 | 2 | 3 | 4 | 5 | 1 | 2 | 3 | 4 |
| Transparency | | | | | | | | | |
| Total light transmittance (%) | 89 | 89 | 89 | 90 | 90 | 90 | 41 | 72 | 91 |
| Haze value (%) | 6.4 | 7.0 | 8.5 | 5.4 | 9.4 | 5.2 | 97 | 44 | 5.0 |
| Properties of vulcanized rubber | | | | | | | | | |
| Tensile strength (kgf/cm$^2$) | 178 | 170 | 166 | 85 | 103 | 51 | 126 | 47 | 22 |
| Elongation at break (%) | 660 | 600 | 690 | 700 | 710 | 600 | 580 | 820 | 900 |
| Hardness | 72 | 73 | 79 | 65 | 72 | 69 | 75 | 65 | 61 |
| Thermal aging resistance (after aging at 120° C. for 120 hours) | | | | | | | | | |
| Tensile strength (kgf/cm$^2$) | 149 | 161 | 158 | 121 | 130 | Unmeasurable (Cracks develop) | 120 | Unmeasurable (Cracks develop) | Unmeasurable (Cracks develop) |
| Elongation at break (%) | 480 | 520 | 600 | 630 | 630 | Unmeasurable | 350 | Unmeasurable | Unmeasurable |

TABLE 2-continued

| | | | | | No. | | | |
|---|---|---|---|---|---|---|---|---|
| | Example | | | | | Comparative Example | | |
| Properties | 1 | 2 | 3 | 4 | 5 | 1 | 2 | 3 | 4 |
| Weather resistance (after 360 hours in fade meter) | | | | | | (Cracks develop) | | (Cracks develop) | (Cracks develop) |
| Discoloration | Absent | Absent | Absent | Absent | Absent | Yellowing Present | Yellowing Absent | Yellowing Absent | Yellowing Absent |
| Crack | " | " | " | " | " | | | | |

TABLE 3

| | | | | No. | | | | |
|---|---|---|---|---|---|---|---|---|
| Compounding ingredient and vulcanization conditions | Example | | | | | Comparative Example | | |
| | 6 | 7 | 8 | 9 | 10 | 5 | 6 | 7 |
| Esprene ® 524 (Note 1) | 100 | 100 | 100 | — | — | 100 | 100 | 100 |
| Esprene ® 201 (Note 2) | — | — | — | 100 | 100 | — | — | — |
| Nipsil ® VN3 (Note 3) | — | — | — | — | — | 40 | — | — |
| Aerosil ® 200 (Note 4) | 40 | 40 | 50 | — | — | — | 40 | 40 |
| Aerosil ® 300 (Note 5) | — | — | — | 20 | 60 | — | — | — |
| Diana ® PW-90 (Note 6) | 10 | 10 | 10 | — | 15 | 10 | 10 | 10 |
| Stearic acid | 1 | 1 | 1 | 1 | 1 | 1 | 1 | 1 |
| Zinc carbonate | — | — | — | — | — | — | — | 5 |
| Perhexa ® 3M (Note 7) | 3 | 3 | 3 | — | — | 3 | — | 3 |
| Perhexa ® 25B (Note 8) | — | — | — | 3 | 3 | — | 3 | — |
| Ethylene dimethacrylate | 4 | 4 | 4 | 4 | 4 | 4 | 4 | 4 |
| Sanol ® 770 (Note 9) | 0.2 | 0.1 | — | — | 0.2 | — | — | — |
| Irganox ® MD1024 (Note 10) | — | 0.2 | 0.5 | 0.5 | — | — | 0.2 | 0.2 |
| Irganox ® 1010 (Note 11) | — | — | — | 0.2 | — | — | — | 0.2 |
| Sumisorb ® 300 (Note 12) | 0.2 | 0.2 | — | 0.3 | 0.2 | — | 0.5 | — |
| Sumisorb ® 500 (Note 13) | — | — | — | 0.2 | — | — | — | 0.2 |
| Sanol ® 944 (Note 14) | — | — | 0.5 | — | 0.2 | — | — | — |
| Sumisorb ® 350 (Note 15) | — | — | 0.2 | — | — | — | — | — |
| Vulcanization conditions | 150° C. × 10 min | | | 170° C. × 10 min | | 150° C. × 10 min | 170° C. × 10 min | 150° C. × 10 min |

TABLE 4

| | | | | No. | | | | |
|---|---|---|---|---|---|---|---|---|
| | Example | | | | | Comparative Example | | |
| Properties | 6 | 7 | 8 | 9 | 10 | 5 | 6 | 7 |
| Transparency | | | | | | | | |
| Total light transmittance (%) | 88 | 89 | 89 | 90 | 87 | 72 | 88 | 41 |
| Haze value (%) | 6.5 | 7.2 | 7.5 | 5.6 | 9.0 | 44 | 7.3 | 97 |
| Properties of vulcanized rubber | | | | | | | | |
| Tensile strength (kgf/cm²) | 175 | 171 | 163 | 88 | 108 | 47 | 162 | 121 |
| Elongation at break (%) | 640 | 620 | 660 | 730 | 700 | 820 | 600 | 580 |
| Hardness | 72 | 73 | 79 | 65 | 72 | 65 | 73 | 75 |
| Weather resistance (after 500 hours in fade meter) | | | | | | | | |
| Discoloration | Absent | Absent | Absent | Absent | Absent | Yellowing Present | Yellowing Present | Yellowing Present |
| Crack | " | " | " | " | " | | | |

What is claimed is:

1. An ethylene-α-olefin vulcanized rubber composition with excellent weather resistance and high transparency which is formed by vulcanizing with an organic peroxide an unvulcanized rubber composition consisting essentially of an ethylene-α-olefin rubber containing no metal oxide nor metal carbonate added thereto and containing 10 to 70 parts by weight of anhydrous silica with an average particle diameter of its primary particles of 20 nm or less, 0.01 to 2 parts by weight of at least one compound selected from those represented by the general formula (I), (II) and (III) shown below, and 0 to 2 parts by weight of at least one compound selected from those represented by the general formulas (V) and (VI) shown below, each relative to 100 parts by weight of said rubber:

General formula (I)

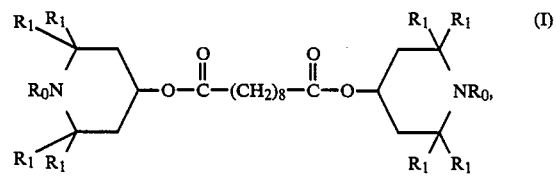

wherein $R_0$ denotes hydrogen or an alkyl group of 1 to 3 carbon atoms, and $R_1$ denotes an alkyl group of 1 to 3 carbon atoms;

General formula (II)

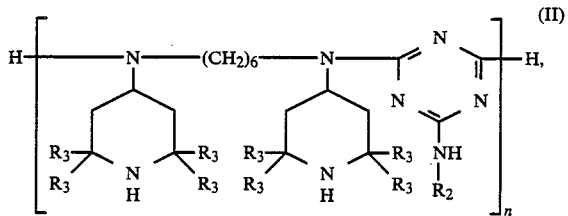

wherein $R_2$ denotes an alkyl group of 6 to 10 carbon atoms, $R_3$ denotes an alkyl group of 1 to 3 carbon atoms, and n denotes a real number from 1 to 5;

General formula (III)

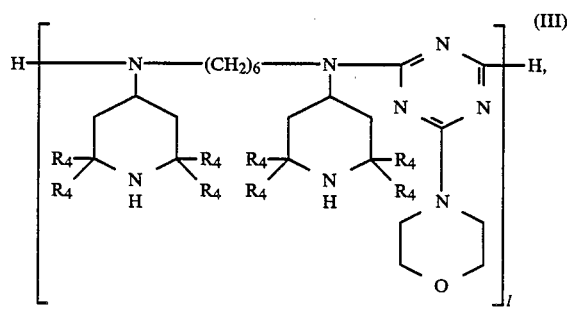

wherein $R_4$ denotes an alkyl group of 1 to 3 carbon atoms, and l denotes a real number from 1 to 5;

General formula (V)

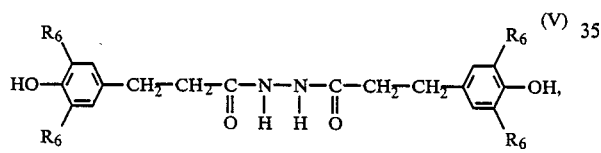

wherein each $R_6$ denotes an alkyl group of 1 to 9 carbon atoms; and

General formula (VI)

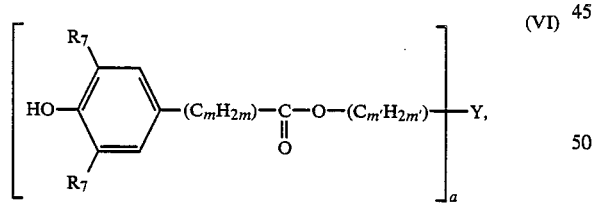

wherein each $R_7$ denotes an alkyl group of 1 to 6 carbon atoms, Y denotes C, S, C—C or O—C—C—O, a denotes a number of 1, 2 or 4, m denotes an integer from 1 to 6, and m' denotes an integer from 1 to 16.

2. An ethylene-α-olefin vulcanized rubber composition with excellent weather resistance and high transparency which is formed by vulcanizing with an organic peroxide an unvulcanized rubber composition consisting essentially of an ethylene-α-olefin rubber containing no metal oxide nor metal carbonate added thereto and containing 10 to 70 parts by weight of anhydrous silica with an average particle diameter of its primary particles of 20 nm or less, 0.01 to 2 parts by weight of at least one compound selected from those represented by the general formulas (I), (II) and (III) shown below, 0.01 to 2 parts by weight of a compound represented by the general formula (IV) shown below, and 0 to 2 parts by weight of at least one compound selected from those represented by the general formulas (V) and (VI) shown below, each relative to 100 parts by weight of said rubber:

General formula (I)

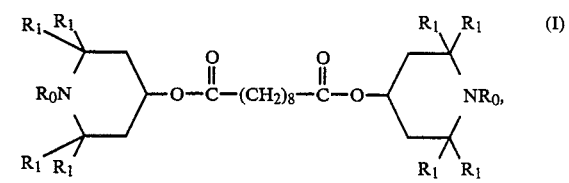

wherein $R_0$ denotes hydrogen or an alkyl group or 1 to 3 carbon atoms, and $R_1$ denotes an alkyl group of 1 to 3 carbon atoms;

General formula (II)

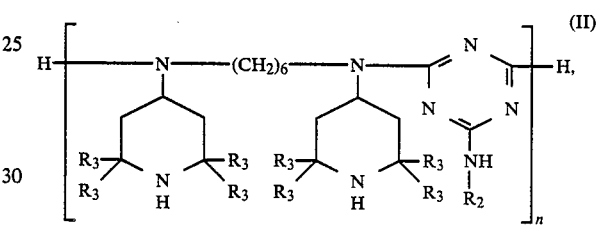

wherein $R_2$ denotes an alkyl group of 6 to 10 carbon atoms, $R_3$ denotes an alkyl group of 1 to 3 carbon atoms, and n denotes a real number from 1 to 5;

General formula (III)

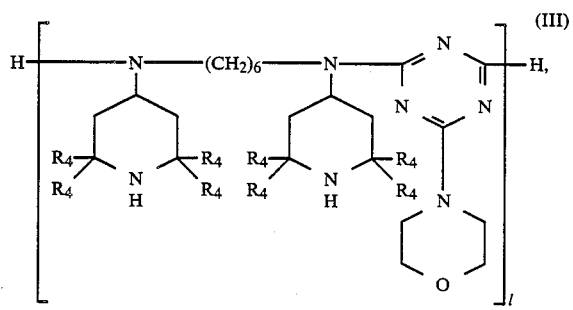

wherein $R_4$ denotes an alkyl group of 1 to 3 carbon atoms, and l denotes a real number from 1 to 5;

General formula (IV)

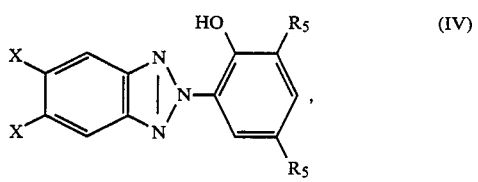

wherein each $R_5$ denotes hydrogen or an alkyl group of 1 to 8 carbon atoms, and each X denotes hydrogen or chlorine;

General formula (V)

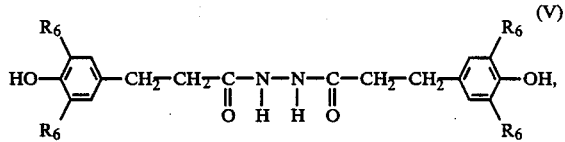

wherein each $R_6$ denotes an alkyl group of 1 to 9 carbon atoms; and

General formula (VI)

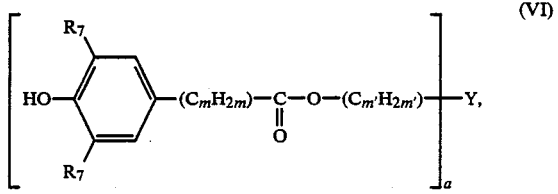

wherein each $R_7$ denotes an alkyl group of 1 to 6 carbon atoms, Y denotes C, S, C—C or O—C—C—O, a denotes a number of 1, 2 or 4, m denotes an integer from 1 to 6, and m' denotes an integer from 1 to 16.

3. A rubber composition according to claim 1 or 2, wherein the compound represented by the general formula (I) is Bis(2,2,6,6-tetramethyl-4-piperidyl)sebacate or Bis(1,2,2,6,6-tetramethyl-4-piperidyl)sebacate.

4. A rubber composition according to claim 1 or 2, wherein the compound represented by the general formula (II) is Poly{[6-(1,1,3,3-tetramethyl butyl)amino-1,3,5-triazine-2,4-diyl)][2,2,6,6-tetramethyl-4-pyperidyl)imino]hexamethylene[(2,2,6,6-tetramethyl-4-pyperidyl)amino]}.

5. A rubber composition according to claim 1 or 2, wherein the compound represented by the general formula (III) is Poly{(6-morpholino-s-triazine-2,4-diyl) [(2,2,6,6-tetramethyl-4-pyperidyl)imino]-hexamethylene[(2,2,6,6-tetramethyl-4-pyperidyl)imino]}.

6. A rubber composition according to claim 1 or 2, wherein the compound represented by the general formula (IV) is 2-(2'-hydroxy-3'-t-butyl-5'-methylphenyl)-5-chlorobenzotriazole or 2-(2'-hydroxy-3',5'-t-amylphenyl)benzotriazole.

7. A rubber composition according to claim 1 or 2, wherein the compound represented by the general formula (V) is N,N'-Bis[3-(3,5-di-t-butyl-4-hydroxyphenyl)propionyl]hydrazine.

8. A rubber composition according to claim 1 or 2, wherein the compound represented by the general formula (VI) is Pentaerythritol tetrakis[3-(3,5-di-t-butyl-4-hydroxyphenyl)]propionate, triethyleneglycol-bis[3-(3'-t-butyl-5'-methyl-4'-hydroxyphenyl)]propionate, 1,6-hexanediol-bis[3-(3',5'-di-t-butyl-4'-hydroxyphenyl)]propionate, 2,2-thio-diethylene-bis[3-(3',5'-di-t-butyl-4'-hydroxyphenyl)]propionate, or octadecyl-3-(3',5'-di-t-butyl-4'-hydroxyphenyl)propionate.

9. A rubber composition according to claim 1 or 2, wherein said ethylene-α-olefin rubber is a copolymer formed of ethylene and at least one kind of α-olefin or a copolymer formed of ethylene, at least one kind of α-olefin, and at least one kind of unconjugated diene.

10. A rubber composition according to claim 9, wherein said α-olefin is propylene, 1-butene, 1-pentene, or 1-hexene.

11. A rubber composition according to claim 9, wherein said unconjugated diene is dicyclopentadiene, ethylidenorbornene, 1,4-hexadiene, methyltetrahydroindene, or methylnorbornene.

12. A rubber composition according to claim 1 or 2, wherein said organic peroxide is at least one compound selected from diacyl peroxides, dialkyl peroxides, peroxyesters, and perketals.

* * * * *